A. MUNCH.
METALLIC PACKING RING FOR PISTON RODS.
APPLICATION FILED JAN. 2, 1914.
1,095,163.
Patented Apr. 28, 1914.
2 SHEETS—SHEET 1.
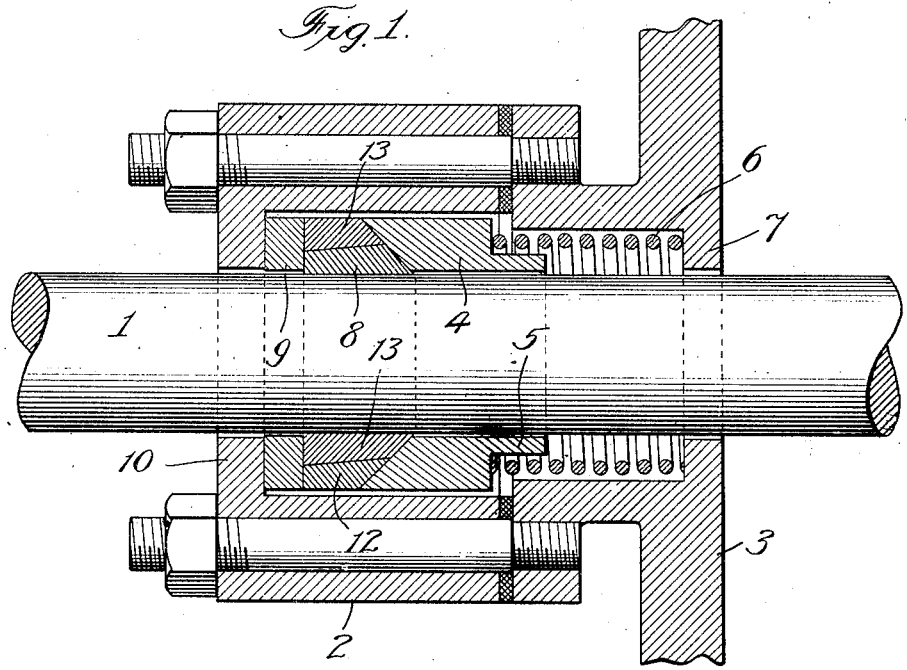
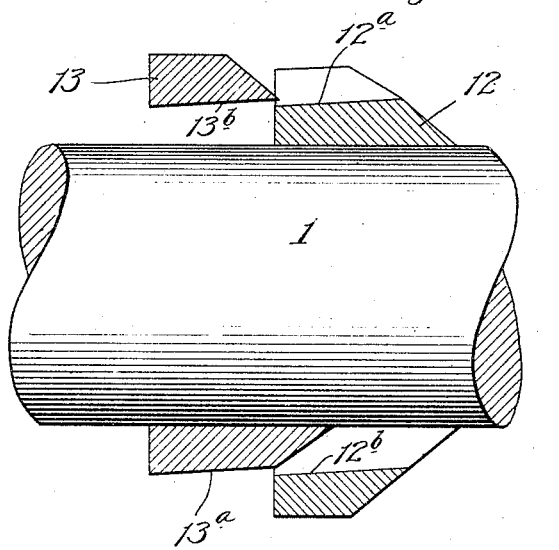
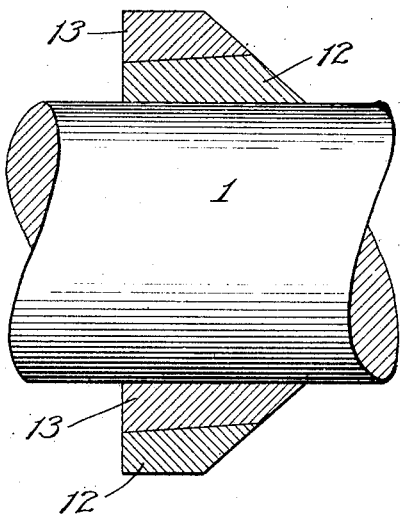
Witnesses:
Inventor:
A. Munch
By Paine, Fisher & Clapp
Attys.

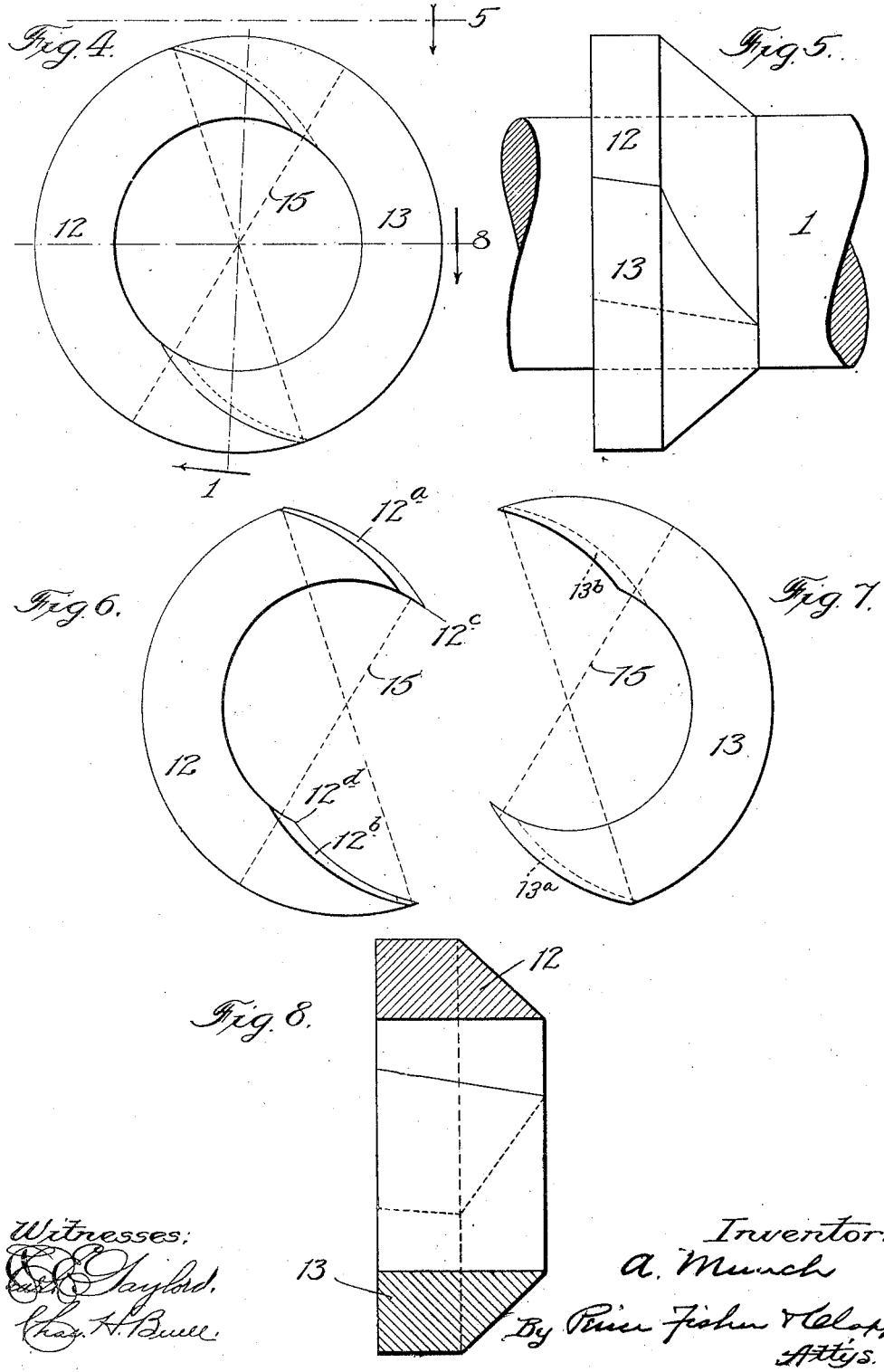

UNITED STATES PATENT OFFICE.

ALFRED MUNCH, OF MAYWOOD, ILLINOIS.

METALLIC PACKING-RING FOR PISTON-RODS.

1,095,163.  Specification of Letters Patent.  Patented Apr. 28, 1914.

Application filed January 2, 1914. Serial No. 809,895.

*To all whom it may concern:*

Be it known that I, ALFRED MUNCH, a citizen of the United States, and a resident of the village of Maywood, county of Cook, and State of Illinois, have invented certain new and useful Improvements in Metallic Packing-Rings for Piston-Rods, of which I do declare the following to be a full, clear, and exact description, reference being had to the accompanying drawings, forming part of this specification.

The present invention has relation particularly to that class of metallic packing rings that are made of sections formed in such manner as to enable them to be slipped laterally over the piston rod (thus avoiding the necessity of removing the cross head) and then be moved longitudinally of the rod until the sections are opposite and interlocked one with the other. Samples of this type of metallic packing rings are shown in Letters Patent No. 211,299, C. C. Jerome, January 14, 1879, and No. 914,426 to the assignee of C. W. G. King, March 9, 1909.

The primary object of the present invention is to provide a metallic packing ring formed of sections, the curved abutting faces of the meeting ends of which are formed upon substantially the same angle with respect to the axis of the ring, the curved meeting faces extending from such axis in one and the same direction, as I have found that by such construction a more effective ring is produced and an easier assembling of the ring sections can be accomplished.

In the drawings Figure 1 is a sectional elevation of a piston rod stuffing box with the piston rod in place. Fig. 2 is a view in elevation of a part of the piston rod with the ring sections thereon, said sections being in the position occupied by them as they are about to be assembled. Fig. 3 is a view similar to Fig. 2 but showing the ring sections assembled or interlocked. Fig. 4 is a plan view of the complete ring with its sections assembled. Fig. 5 is a view in side elevation showing the ring in position upon the rod. Fig. 6 is a detail plan view of one of the sections of the ring. Fig. 7 is a detail plan view of the other section of the ring. Fig. 8 is a view in cross section on line 8—8 of Fig. 4.

1 represents the piston rod passing through a stuffing box secured to a cylinder head. This stuffing box is composed of a body portion 2 that is detachably bolted to a cylinder head 3. Within this body portion 2 is a cup 4 encircling the rod 1, the inner end of this cup 4 being formed with a reduced portion 5 that is engaged by a coil spring 6. The coil spring 6 encircles the piston rod 1 and bears against a flange 7 on the cylinder head 3. The outer end face of the cup 4 is conical and forms a bearing face for the conical portion of my improved packing ring 8. The washer 9 engages the outer end of the packing ring 8 and in turn, is held against outward movement by a flange 10 on the outer end of the body portion 2 of the stuffing box. The cup 4 and the washer 9 have interior diameters slightly greater than the diameter of the rod 1 and exterior diameters slightly less than the interior diameter of the body portion 2 of the stuffing box, thereby preventing wear on these parts.

The novelty of the present invention resides in the packing ring 8 and especially in the shape given to the opposing meeting end portions of the ring sections. The ring 8 is formed of the two sections 12 and 13. The ring section 12 has one of its ends formed with a convex, curved face $12^a$ that inclines at an angle (preferably about five degrees) to the axis of the packing ring and has its opposite end formed with a concave, curved face $12^b$ that is inclined in the same direction with respect to the axis of the ring as the curved face $12^a$ and preferably at the same angle. Similarly, the ring section 13 has one of its ends formed with a convex, curved and inclined surface $13^a$ (see Fig. 2) adapted, when the sections are assembled, as shown in Fig. 4, to engage with the inclined, concave, curved surface $12^b$ of the ring section 12; and the opposite end of the ring section 13 is formed with a concave, curved and inclined surface $13^b$ adapted to engage the convex, curved and inclined surface $12^a$ of the ring section 12. The dotted lines adjacent the ends of the ring section 13, in Fig. 7, indicate the inclination of the curved surfaces of the ends of the ring section.

In Figs. 6 and 7 is shown a dotted line 15 that passes through the axial center of the ring and it will be observed that this line 15 intersects the curved surfaces $12^a$ and $12^b$ of the ring section 12 about midway the length of the ring. Hence, the distance between the points $12^c$ and $12^d$ of the section 12 (and between similar points of the section 13) is a trifle less than the diameter of the ring or of the piston rod on which the ring will be placed, but this difference is so slight that the ring section, being formed of soft metal, can readily be slipped over the piston rod laterally, since the interior diameter of the ring may be, in practice, slightly larger (from a 32nd to a 64th of an inch) than the exterior diameter of the piston rod.

In assembling the sections of my improved packing ring, the body 2 of the stuffing box is first moved outwardly from the cylinder head, by loosening the bolts that connect it therewith. Each ring section is then slipped laterally (radially) over the piston rod and the sections are next moved toward each other and longitudinally of the rod until the sections are opposite each other and interlocked, as shown in Figs. 1, 2 and 5 of the drawings. The ring is then moved into the cup 4 and the body of the stuffing box is replaced in operative position, as shown in Fig. 1 of the drawings.

Inasmuch as the convex and concave, curved surfaces of the ring sections incline or taper longitudinally of the axis in the same direction, it will be seen (as by reference to Fig. 2) that when the ring sections have been placed upon the rod, the end of the section 12 having the convex, curved surface 12ª will readily pass between the rod 1 and the concave, curved surface 13ᵇ of the ring section 13, while the end of the ring section 12 having the concave, curved surface 12ᵇ will pass over the convex, curved surface 13ª of the ring section 13.

When, as in the Jerome patent hereinbefore mentioned, the faces of the curved meeting ends of the two sections of the packing ring are disposed at opposite angles to the axis of the piston rod, or when these curved meeting faces of the ring sections extend parallel with the axis of the rod, as in the above mentioned King patent, a very exact alinement of the meeting faces of the sections must be had before these sections can be moved together and caused to interlock. But with a ring constructed in accordance with my present invention, in which the curved meeting faces of the ends of the ring sections are angled or inclined in the same direction with respect to the axis of the rod, one section will not contact with the other section until actually in complete engagement therewith, but will slip freely and without any nicety of alinement into complete engagement. When this is accomplished, the sections are opposite each other and the curved meeting faces of their ends will be in snug or wedging engagement, thereby effecting a tight joint against the passage of steam. Hence, it will be seen that the ring sections made in accordance with my present invention can be much more readily assembled than with prior constructions and any slight inaccuracies of the meeting faces of the ring sections are taken care of by the wedging engagement of these sections when in interlocked position.

Having thus described my invention, what I claim as new and desire to secure by Letters Patent, is:—

1. A soft, metallic packing ring comprising two sections, each section having an end adapted to overlap the adjacent end of the other section, the overlapping ends having curved meeting faces adapted to interlock the ring sections upon the rod and the curved faces at opposite ends of the ring sections being inclined in the same direction relatively to the axis of the ring.

2. A soft, metallic packing ring comprising two sections, each section having an end adapted to overlap the adjacent end of the other section, the overlapping ends having curved meeting faces adapted to interlock the ring sections upon the rod and the faces at opposite ends of the ring section being substantially parallel to each other and inclined to the axis of the ring.

ALFRED MUNCH.

Witnesses:
 ELEANOR HOGUNOW,
 J. G. ANDERSON.